United States Patent [19]
Crockatt et al.

[11] Patent Number: 4,539,047
[45] Date of Patent: * Sep. 3, 1985

[54] CLEAR COATINGS TO PROTECT WOOD FROM DISCOLORING AND GREYING ON EXTERIOR EXPOSURE

[75] Inventors: William B. Crockatt, Mississauga; John Rimma, Scarborough, both of Canada

[73] Assignee: DeSoto, Inc., Des Plains, Ill.

[*] Notice: The portion of the term of this patent subsequent to May 22, 2001 has been disclaimed.

[21] Appl. No.: 599,740

[22] Filed: Apr. 12, 1984

[51] Int. Cl.³ .............................................. C08L 91/00
[52] U.S. Cl. ..................................... 106/268; 523/518
[58] Field of Search ....................... 106/259, 253, 268

[56] References Cited

U.S. PATENT DOCUMENTS 2,558,304 6/1951 Marcot ................................. 106/259
4,450,247 5/1984 Crockatt ............................. 523/518

Primary Examiner—Theodore Morris
Attorney, Agent, or Firm—Dressler, Goldsmith, Shore, Sutker & Milnamow, Ltd.

[57] ABSTRACT

A clear air drying coating composition adapted for the coating of wood to preserve its freshly prepared appearance is disclosed in which a solution of an unsaturated oil-containing resin in a solvent medium containing at least 50% of mineral spirits has stably dispersed therein from about 13 to 63 parts of granulated paraffin wax having an average melting point in the range of 50° C.–70° C. and from 0.5 to 20 parts of a transparent ultraviolet-absorbing pigment per 100 parts of the resin, the pigment being preferably yellow to maintain the natural color of the freshly prepared wood.

15 Claims, No Drawings

CLEAR COATINGS TO PROTECT WOOD FROM DISCOLORING AND GREYING ON EXTERIOR EXPOSURE

DESCRIPTION

1. Technical Field

This invention relates to clear coatings which are intended to be applied directly to the prepared surface of bare wood intended for use, for example, as a building material, to protect the wood from the discoloring and greying normally associated with exterior exposure.

2. Background Art

Wood of various types are common and attractive building materials, but the wood, and especially its surface, degrades on long term exterior exposure. It is common to paint wood with pigmented coatings to protect it, but this conceals the natural beauty of the freshly prepared wood surface. Also, even painted wood degrades because the paint does not adequately repel water for a long period of time. The need to provide air drying coatings which would provide long term water repellency was discussed in our prior application Ser. No. 368,136 filed Apr. 14, 1982, now U.S. Pat. No. 4,450,247, the disclosure of which is hereby incorporated by reference.

In that prior application, we disclosed how to incorporate large proportions of paraffin wax in oil modified alkyd resin coating compositions in order to provide long term water repellency, and the concepts there disclosed are applicable to both pigmented and clear finishes. Nonetheless, and while that disclosure is well adapted to provide long term water repellency, it does not teach one how to provide a clear water repellent coating which will also protect the natural color of the freshly prepared wood.

DISCLOSURE OF INVENTION

In accordance with this invention, a clear air drying coating composition adapted for the coating of wood to preserve its freshly prepared appearance comprises a solution of: (1) an unsaturated oil-containing resin in (2) a solvent medium containing at least 50% of mineral spirits, (3) from about 13 to 63 parts of granulated paraffin wax having an average melting point in the range of 50° C.–70° C. per 100 parts of resin stably dispersed in the solution, and the solution also has dispersed therein (4) from 0.5 to 20 parts of a transparent ultraviolet-absorbing pigment per 100 parts of said resin. These pigments are desirably hydrated iron oxide pigments, and those which are yellow are most preferred.

The essence of this invention is the combination in an air drying clear resinous coating of a large proportion of wax with the transparent ultraviolet-absorbing pigment which, together, enable the natural appearance of the freshly prepared wood to be retained on exterior exposure for long periods of time. This has not previously been feasible.

The preferred transparent pigments are hydrated iron oxide pigments which may be black, yellow or red. These absorb ultraviolet light from the sun and these colors allow minimum deviation from the natural color of freshly sanded or planed wood. In most instances, the wood surface is yellow, and a yellow coloration can be tolerated without noticeably disturbing the unmodified wood appearance. However, in some instances a slightly stained appearance is acceptable, and then black or red tints may be used.

From the standpoint of available materials, it is preferred to employ a hydrated ferric oxide which is obtained by oxidation of precipitated iron oxide. These are produced by the Hilton-Davies company. The product sold as trans-oxide yellow under the trade identification 10-SC-24-A232 will be used herein as illustrative. It is preferred to disperse these pigments in the coating compositions of this invention as a concentrated paste in a long oil alkyd. A suitable paste contains 32.2% pigment dispersed in a mineral spirits solution of a 65% oil length soya alkyd based on glyceryl phthalate containing 24.5% of phthalic anhydride.

The transparent pigment is present in the coatings of this invention in a sufficient amount as to absorb most of the solar ultraviolet radiation, but its pale coloration does not greatly modify the natural wood color. This is especially true of the yellow pigment which provides a yellow color close to that of many natural wood surfaces, especially that of cedar, so as to leave the natural color of the wood substantially undisturbed. Per 100 parts of resin, one may use from 0.5 to 20 parts, preferably from 1 to 6 parts, and most preferably from 2–4 parts of the transparent pigment. The maximum proportions are largely dictated by economic considerations because the pigment is expensive. However, at the smaller proportions, the ultraviolet protection is good, and the cost is tolerable. The result is a water repellent clear coating solution which contains an unsaturated oil-containing resin heavily loaded with paraffin wax so that long term water repellency is provided. This solution deposits clear coatings which screen out most of the damaging ultraviolet radiation. The resulting coating protects the wood from the detrimental effect of swelling and shrinking due to the absorption of water, it resists the decay and staining caused by fungi which cannot attack the wood substrate because the water needed for their survival is not present, and the ultraviolet penetration which causes wood to grey is adequately overcome without objectionably discoloring or obstructing the wood surface.

The granulated paraffin wax desirably has an average diameter less than 1 mm and is incorporated by a vigorous agitation at a temperature of at least about 35° C. The desired temperature is preferably provided by the vigorous agitation, but extraneous heat may also be used. This wax should have an average melting point in the range of 50° C.–70° C., preferably 55° C.–65° C. Preferred proportions are from 53–63 parts of wax on the previously stated basis.

While polyester resins are the usual resins which are oil modified to provide air dry solvent-based coatings, any soluble resin having reactive groups can be combined with oils to provide the desired air drying soluble oil-containing resin. Thus, polyethers which include glycerin can be used to form hydroxy-functional resins which can be reacted with drying fatty acids to form the desired oil-containing resin. To further illustrate this known class of materials, resinous polyisocyanates can be used. These are provided by reacting an hydroxy-functional resin, such as a polyester, polyether or copolymer including hydroxyethyl acrylate or allyl alcohol, with a diisocyante like isophorone diisocyanate. The diisocyanate is used in excess to provide an isocyanate-functional resin which is then reacted with an unsaturated fatty acid to consume the isocyanate functionality.

The preferred alkyd resins are high viscosity alkyd resins which are used in relatively low solids content solution (25% to 40%) in a solvent medium containing at least 90% mineral spirits. An appropriate high viscosity is indicated with respect to a 30% solids content solution of the alkyd in regular mineral spirits, and is a solution viscosity on the Gardner scale of at least R, most usually from S to U.

The alkyd resins which are preferred for use herein are oil modified hydroxy-functional polyesters. Indeed, the term alkyd suggests the presence of oil or oil fatty acid in the resin. As is well known, polyesters are formed by the polyesterification of polycarboxylic acids, such as phthalic acid or adipic acid, with polyhydric alcohols, such as ethylene glycol or glycerin, and a stoichiometric excess of hydroxyl over carboxyl of from 10% to 40% is contemplated herein. To provide the desired high viscosity at low solids content, at least 50% of the hydroxy functionality is provided by a polyhydric alcohol containing at least three hydroxyl groups per molecule, such as trimethylol propane, or pentaerythritol, as is preferred.

Enough unsaturated oil should be present in the oil-containing resin to enable a practical air dry to be obtained. This usually requires that at least 30% of the resin should be constituted by an unsaturated oil or fatty acid derived therefrom, preferably from 35% to 65%. Oil selection herein is conventional, so all the drying and semi-drying oils and fatty acids contained therein are useful herein. Soybean oil is a typical drying oil and will be used as illustrative herein. A 47% by weight soybean oil alkyd in which the polyester contains 157 parts of pentaerythritol, 73.2 parts of ethylene glycol, 389 parts of phthalic and 11.2 parts of maleic anhydride will be used in the accompanying example. This alkyd is cooked to an acid value of less than 30, preferably less than 20, and it is provided as a 35% solution in mineral spirits.

The preferred solvent is mineral spirits which provides practical air dry paints. The preferred solvent media consist essentially of mineral spirits (which need not be odorless) to which is optionally added up to about 1% of an alcohol, like ethyl alcohol, to help suspend the clay which is desirably present. Other more costly solvents which may be present are aromatic hydrocarbons, such as toluene, and diverse solvents such as methyl ethyl ketone and butyl acetate.

The wax granules are used in such large amount that they do not dissolve in the largely mineral spirits solvent medium, but they do dissolve sufficiently in the resin solution using high speed mixing which increases the temperature as mixing proceeds. Extraneous heat may be used to help provide the desired mixing temperature. This causes the wax to become stably dispersed in the resin solution. It is usually not necessary to exceed about 40° C., but up to about 60° C. can be used. The wax component cannot be incorporated stably by simply heating the wax in mineral spirits to dissolve the wax because the so-dissolved wax precipitates in the alkyd resin solution on standing and is not easily redispersed.

Other components which are customarily present in air dry alkyd paints may also be added, such as bodying agents, suspending agents, surfactants, driers, antioxidants, and the like. Clays are particularly beneficial because they reduce the gloss, and help to stably suspend the hydrated iron oxide pigment. Driers are commonly added to speed the drying action, as is well known, and these will be illustrated in the examples. The essential components are the solvent, the unsaturated oil-containing resin, the large proportion of wax granules, and the small proportion of transparent yellow oxide pigment.

The coatings of this invention can be applied in various ways, typically by brush, and the applied coatings are allowed to dry in air. Unsealed wood, particularly cedar, is especially contemplated as the substrate to be coated.

All parts and proportions herein are by weight, unless otherwise specified.

The invention is illustrated in the examples which follow.

EXAMPLE 1

560 parts of soybean oil and 108 parts of pentaerythritol are heated to 200° C. and then 0.52 part of zinc acetate is added and the temperature is increased to 250° C.–260° C. and this temperature is maintained until a clear pill is formed when a sample is cooled, which occurs after about 3 hours. The product is then cooled to about 170° C. and the following mixture is added.

| Component | Parts |
| --- | --- |
| pentaerythritol | 49.2 |
| ethylene glycol | 73.2 |
| phthalic anhydride | 389. |
| maleic anhydride | 11.2 |
| triphenyl phosphite | 0.7 |

After this mixture has been added, the temperature is raised to 180° C. and held for 2 hours. Then 20 parts of xylol are added and the mixture is refluxed while removing water until the acid value is about 15. As the reaction proceeds, the refluxing temperature slowly increases and is about 235° C. at the end of the run. Odorless mineral spirits are mixed in to provide a solution having a solids content of 35%. This alkyd resin has an hydroxy excess over carboxyl of 27%.

EXAMPLE 2

An air drying coating is made from the following components.

| | Parts | Component |
| --- | --- | --- |
| 1 | 1760.0 | Soya alkyd (solution of Example 1) |
| 2 | 158.0 | Bentone clay (suspending aid) |
| 3 | 168.0 | Odorless mineral spirits |
| 4 | 40.0 | Ethyl alcohol |
| 5 | 90.0 | Attapulgite clay |
| 6 | 650.0 | granulated paraffin wax (average diameter less than 1 mm) [see note 1] |
| 7 | 1522.0 | Soya alkyd (solution of Example 1) |
| 8 | 20.0 | Cobalt naphthenate drier solution (12%) |
| 9 | 20.0 | Zirconium naphthenate drier solution (12%) |
| 10 | 20.0 | Calcium naphthenate drier solution (6%) |
| 11 | 3753.0 | Odorless mineral spirits |
| 12 | 234.0 | Transparent yellow oxide pigment in long oil alkyd (see note 2) |

| -continued | | |
|---|---|---|
| | Parts | Component |
| 13 | 20.0 | Methyl ethyl ketoxime |

Note 1: The granulated wax used is a paraffin wax having a melting range of 56° C. to 58° C. (average melting point = 57° C.) It would be desirable to have the particle size as small as possible, but these waxes are soft and fine particle size is difficult to maintain. A commercial granulated paraffin wax RPW 1236 from International Wax may be used.

Note 2: A hydrated ferric oxide obtained by oxidation of precipitated iron oxide. The product produced by the Hilton-Davies company and sold as trans-oxide yellow under the trade identification 10-SC-24-A232 may be used. It is used here as a 32.2% pigment dispersion in mineral spirits solution of a 65% oil length glyceryl phthalate soya alkyd containing 24.5% of phthalic anhydride.

Components 1-6 are dispersed using high speed mixing. The temperature rise during mixing is held to 40° C. to stably disperse the granulated wax. The wax granules appear to dissolve, but are colloidally dispersed. The remaining components are then added, one at a time, to the hot mixture while high speed mixing continues. The final solution provides a clear paint for wood which air dries. The dried paint shows the original wood surface clearly and it resists water, discoloration and greying for an extended period on outdoor exposure.

What is claimed is:

1. A clear air drying coating composition adapted for the coating of wood to preserve its freshly prepared appearance comprising, a solution of: (1) an unsaturated oil-containing resin in (2) a solvent medium containing at least 50% of mineral spirits, (3) from about 13 to 63 parts of granulated paraffin wax having an average melting point in the range of 50° C.–70° C. per 100 parts of said resin stably dispersed in said solution, and said solution having dispersed therein (4) from 0.5 to 20 parts of a transparent ultraviolet-absorbing pigment per 100 parts of said resin.

2. A coating composition as recited in claim 1 in which said pigment is a hydrated iron oxide pigment.

3. A coating composition as recited in claim 2 in which said pigment has a yellow color.

4. A coating composition as recited in claim 1 in which said solvent medium contains at least 90% of mineral spirits.

5. A coating composition as recited in claim 4 in which said paraffin wax is present in an amount of from 53-63 parts per 100 parts of said resin.

6. A coating composition as claimed in claim 5 in which said wax has an average melting point in the range of 55° C. to 65° C.

7. A coating composition as recited in claim 1 in which said oil-containing resin has an oil length of at least about 30% and is an alkyd resin.

8. A coating composition as recited in claim 7 in which said alkyd resin is an hydroxyl-functional polyester containing at least 35% of oil or oil fatty acid of drying or semi-drying character, and in which the excess of hydroxyl over carboxyl functionality is from 10% to 40%, at least 50% of the hydroxy functionality being provided by a polyhydric alcohol containing at least three hydroxyl groups per molecule, and said alkyd resin is cooked to an acid value of less than 30.

9. A coating composition as recited in claim 8 in which said polyhydric alcohol is pentaerythritol.

10. A coating composition as recited in claim 9 in which said oil is soybean oil.

11. A coating composition as recited in claim 9 in which said pigment is a transparent yellow hydrated ferric oxide pigment.

12. A coating composition as recited in claim 1 in which said wax granules are incorporated by dispersing said granules having an average diameter less than 1 mm using vigorous agitation to increase the temperature of the composition to at least about 35° C.

13. A clear air drying coating composition adapted for the coating of wood to preserve its freshly prepared appearance comprising, a solution of an unsaturated oil-containing alkyd resin having an oil length of 35% to 65% in a solvent medium consisting essentially of mineral spirits, from about 53 to 63 parts of granulated paraffin wax having an average melting point in the range of 50° C.–70° C. per 100 parts of said resin stably dispersed in said solution, and said solution having dispersed therein from 1 to 6 parts of a transparent yellow hydrated ferric oxide pigment per 100 parts of said resin.

14. A coating composition as recited in claim 13 in which from 2 to 4 parts of said pigment is used per 100 parts of said resins.

15. A coating composition as recited in claim 13 in which said alkyd resin is a soya-modified hydroxyl-functional polyester in which the excess of hydroxyl over carboxyl functionality in the polyester is from 10% to 40%, at least 50% of the hydroxy functionality being provided by pentaerythritol, and said alkyd resin having an acid value of less than 30.

* * * * *